United States Patent
Bag et al.

(10) Patent No.: US 12,267,406 B2
(45) Date of Patent: Apr. 1, 2025

(54) REDUNDANCY IN AN AUTOMATION SYSTEM COVERING MORE THAN ONE SYSTEM AREA

(71) Applicant: ABB Schweiz AG, Baden (CH)

(72) Inventors: Gargi Bag, Västerås (SE); Maryam Vahabi, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 18/465,460

(22) Filed: Sep. 12, 2023

(65) Prior Publication Data
US 2024/0098162 A1    Mar. 21, 2024

(30) Foreign Application Priority Data
Sep. 16, 2022   (EP) .................................... 22196108

(51) Int. Cl.
| | | |
|---|---|---|
| H04L 69/40 | (2022.01) | |
| H04L 45/24 | (2022.01) | |
| H04L 61/103 | (2022.01) | |
| H04L 69/22 | (2022.01) | |

(Continued)

(52) U.S. Cl.
CPC .............. *H04L 69/40* (2013.01); *H04L 45/24* (2013.01); *H04L 61/103* (2013.01); *H04L 69/22* (2013.01); *H04L 2101/622* (2022.05); *H04L 2101/659* (2022.05)

(58) Field of Classification Search
CPC ....... H04L 69/40; H04L 45/24; H04L 61/103; H04L 69/22
See application file for complete search history.

(56) References Cited

U.S. PATENT DOCUMENTS

| | | | |
|---|---|---|---|
| 11,336,564 B1* | 5/2022 | Mullis | H04L 61/10 |
| 2017/0366618 A1* | 12/2017 | Vrzic | H04L 67/148 |
| 2022/0116146 A1* | 4/2022 | Fang | H04L 12/4641 |

OTHER PUBLICATIONS

Galina Antonova et al.; Communication redundancy for substation automation; Protective Relay Engineers, 2011 64th Annual Conference for, IEEE; Apr. 11, 2011; 12 Pages. (Year: 2011).*

(Continued)

*Primary Examiner* — Oleg Survillo
*Assistant Examiner* — Monishwar Mohan
(74) *Attorney, Agent, or Firm* — Whitmyer IP Group LLC

(57) ABSTRACT

An automation system includes a first system area including a transmitting redundancy handling device and a second system area including a receiving redundancy handling device. Device obtains a first communication protocol packet with automation application data and a sequence number linked thereto, extracts the sequence number and places it in a destination option header of a first IPv6 packet, which also includes the first communication protocol packet, sends packet to the receiving redundancy handling device, obtains a second communication protocol packet having the same automation application data and sequence number, places the sequence number in a destination option header of a second IPV6 packet also including the second communication protocol packet, and sends packet to device. Device receives the packets, analyses the destination option headers, determines that the sequence number is the same in the packets and discards the first or the second IPv6 packet based on the determination.

17 Claims, 7 Drawing Sheets

(51) Int. Cl.
  *H04L 101/622* (2022.01)
  *H04L 101/659* (2022.01)

(56) References Cited

OTHER PUBLICATIONS

Galina Antonova et al.; Communication redundancy for substation automation; Protective Relay Engineers, 2011 64th Annual Conference for, IEEE; Apr. 11, 2011; 12 Pages.
Prinz Frederick et al.; End-to-end Redundancy between Real-time 14.0 Components based on Time-Sensitive Networking; 2018 IEEE 23rd International Conference on Emerging Technologies and Factory Automation (ETFA); Sep. 4, 2018; 4 Pages.
Extended European Search Report; Application No. 22196108.9; Completed: Mar. 14, 2023; Mailed Mar. 28, 2023; 6 Pages.

* cited by examiner

REDUNDANCY IN AN AUTOMATION SYSTEM COVERING MORE THAN ONE SYSTEM AREA

TECHNICAL FIELD

The present disclosure relates to a transmitting redundancy handling device for a first system area of an automation system, a method, computer program and computer program product for handling redundancy for packets transmitted from a first system area of an automation system to a second system area of the automation system, a receiving redundancy handling device for a second system area of an automation system, a method, computer program and computer program product for handling redundancy for packets received in a second system area of an automation system from a first system area of the automation system as well as to an automation system.

BACKGROUND

Redundancy is important in many automation systems, such as in process control systems, where an automation system may comprise many controllers and many field devices communicating with the controllers. Some critical automation applications might require deterministic and reliable data exchange between controllers, i.e. interlocking between controllers. There may also be a requirement of End to End (E2E) redundancy. E2E redundancy is typically carried out using Parallel Redundancy Protocol (PRP) and High Availability Redundancy (HSR), which are both linked to Layer 2 of the Open Systems Interconnection (OSI) model, i.e. to the data link layer of the OSI model. It is more particularly linked to the Medium Access Control (MAC) sublayer. One example of the use of layer 2 redundancy can be found in US 2022/0116146.

Some automation systems cover more than one area, which system areas may be interconnected by one or more routers or gateways. The division into system areas may for instance be needed due to system capacity considerations. However, layer 2 redundancy can only be used inside such a system area. There is therefore a need for enabling E2E redundancy in an automation system that covers several system areas. It is additionally of interest if the redundancy is seamless while at the same time limiting processing in the end nodes.

SUMMARY

One objective of the invention is therefore to provide end-to-end redundancy in an automation system that covers more than one system area.

According to a first aspect there is provided a transmitting redundancy handling device for a first system area of an automation system and for communicating with a receiving redundancy handling device in a second system area of the automation system, the transmitting redundancy handling device implementing a transmission redundancy handling function configured to:
  obtain a first communication protocol packet having automation application data for which redundancy is to be provided and a sequence number linked to the automation application data;
  extract the sequence number from the first communication protocol packet;
  place the sequence number in a destination option header of a first IPv6 packet intended for the receiving redundancy handling device, the first IPv6 packet also comprising the first communication protocol packet;
  send the first IPv6 packet to the receiving redundancy handling device;
  obtain a second communication protocol packet having the same automation application data and the same sequence number;
  place the sequence number in a destination option header of a second IPv6 packet intended for the receiving redundancy handling device, the second IPv6 packet also comprising the second communication protocol packet, and
  send the second IPv6 packet to the receiving redundancy handling device.

According to a second aspect, there is provided a method of handling redundancy for packets transmitted from a first system area of an automation system to a second system area of the automation system, the method being performed by a transmitting redundancy handling function of a transmitting redundancy handling device in the first system area and comprising:
  obtaining a first communication protocol packet having automation application data for which redundancy is to be provided and a sequence number linked to the automation application data;
  extracting the sequence number from the first communication protocol packet;
  placing the sequence number in a destination option header of a first IPv6 packet intended for a receiving redundancy handling device in the second system area, the first IPv6 packet also comprising the first communication protocol packet;
  sending the first IPv6 packet to the receiving redundancy handling device;
  obtaining a second communication protocol packet having the same automation application data and the same sequence number;
  placing the sequence number in a destination option header of a second IPv6 packet intended for the receiving redundancy handling device, the second IPv6 packet also comprising the second communication protocol packet; and
  sending the second IPv6 packet to the receiving redundancy handling device.

According to a third aspect, there is provided a computer program for handling redundancy for packets transmitted from a first system area of an automation system to a second system area of the automation system;
  the computer program comprising computer program code which when run by a processor implements a transmitting redundancy handling function of a transmitting redundancy handling device in the first system area configured to:
  obtain a first communication protocol packet having automation application data for which redundancy is to be provided and a sequence number linked to the automation application data;
  extract the sequence number from the first communication protocol packet;
  place the sequence number in a destination option header of a first IPv6 packet intended for a receiving redundancy handling device in the second system area, the first IPv6 packet also comprising the first communication protocol packet;
  send the first IPv6 packet to a receiving redundancy handling device;

obtain a second communication protocol packet having the same automation application data;

place the sequence number in a destination option header of a second IPv6 packet intended for the receiving redundancy handling device, the second IPv6 packet also comprising the second communication protocol packet; and send the second IPv6 packet to the receiving redundancy handling device.

According to a fourth aspect, there is provided a computer program product for handling redundancy for packets transmitted from a first system area of an automation system to a second system area of the automation system, the computer program product comprising a data carrier with the computer program code according to the third aspect.

According to a fifth aspect there is provided a receiving redundancy handling device for a second system area of an automation system and for communicating with a transmitting redundancy handling device of a first system area of the automation system, the receiving redundancy handling device implementing a receiving redundancy handling function configured to:

receive a first IPv6 packet from the transmitting redundancy handling device, the first IPv6 packet comprising automation application data and a destination option header including a sequence number associated with the automation application data;

analyse the destination option header of the first IPv6 packet with regard to sequence number;

receive a second IPv6 packet from the transmitting redundancy handling device comprising the same automation application data and a destination option header with the same sequence number;

analyse the destination option header of the second IPv6 packet with regard to sequence number;

determine that the sequence number is the same in the first and the second IPv6 packet; and discard the first IPv6 packet or the second IPv6 packet based on the determination.

According to a sixth aspect, there is provided a method of handling redundancy for packets received in a second system area of an automation system from a first system area of the automation system, the method being performed by a receiving redundancy handling function of a receiving redundancy handling device and comprising:

receiving a first IPv6 packet from a transmitting redundancy handling device of the first system area, the first IPv6 packet comprising automation application data and a destination option header including a sequence number associated with the automation application data;

analysing the destination option header of the first IPv6 packet with regard to sequence number;

receiving a second IPv6 packet from the transmitting redundancy handling device comprising the same automation application data and a destination option header with the same sequence number;

analysing the destination option header of the second IPv6 packet with regard to sequence number;

determining that the sequence number is the same in the first and the second IPv6 packet; and discarding the first IPv6 packet or the second IPv6 packet based on the determination.

According to a seventh aspect, there is provided a computer program for handling redundancy in packets received in a second system area of an automation system from a first system area of the automation system;

the computer program comprising computer program code which when run by a processor implements a receiving redundancy handling function of a receiving redundancy handling device in the second system area and configured to:

receive a first IPv6 packet from a transmitting redundancy handling device of the first system area, the first IPv6 packet comprising automation application data and a destination option header comprising a sequence number associated with the automation application data;

analyse the destination option header of the first IPv6 packet with regard to sequence number;

receive a second IPv6 packet from the transmitting redundancy handling device comprising the same automation application data and a destination option header with the same sequence number;

analyse the destination option header of the second IPv6 packet with regard to sequence number;

determine that the sequence number is the same in the first and the second IPv6 packet; and discard the first IPv6 packet or the second IPv6 packet based on the determination.

An eighth aspect is concerned with a computer program product for handling redundancy in packets received in a second system area of an automation system from a first system area of the automation system, the computer program product comprising a data carrier with the computer program code according to the seventh aspect.

A ninth aspect is concerned with an automation system comprising:

a first system area comprising a transmitting redundancy handling device and a second system area comprising a receiving redundancy handling device;

the transmitting redundancy handling device implementing a transmission redundancy handling function configured to:

obtain a first communication protocol packet having automation application data for which redundancy is to be provided and a sequence number linked to the automation application data;

extract the sequence number from the first communication protocol packet;

place the sequence number in a destination option header of a first IPv6 packet intended for the receiving redundancy handling device, the first IPv6 packet also comprising the first communication protocol packet;

send the first IPv6 packet to the receiving redundancy handling device;

obtain a second communication protocol packet having the same automation application data and the same sequence number;

place the sequence number in a destination option header of a second IPv6 packet intended for the receiving redundancy handling device, the second IPv6 packet also comprising the second communication protocol packet; and send the second IPv6 packet to the receiving redundancy handling device;

the receiving redundancy handling device implementing a receiving redundancy handling function configured to:

receive the first IPv6 packet from the transmitting redundancy handling device;

analyse the destination option header of the first IPv6 packet with regard to sequence number;

receive the second IPv6 packet from the transmitting redundancy handling device;

analyse the destination option header of the second IPv6 packet with regard to sequence number;

determine that the sequence number is the same in the first and the second IPv6 packet; and discard the first IPv6 packet or the second IPv6 packet based on the determination.

IPv6 is an abbreviation for Internet Protocol version 6. The first and second IPv6 packets are thereby Internet Protocol packets in the Internet Layer of the Transmission Control Protocol/Internet Protocol (TCP/IP) model or network protocol packets in the Network Layer of the Open Systems Interconnection (OSI) model. The communication protocol packets may on the other hand be transport protocol packets in the transport layer of the TCP/IP or OSI models.

The transmitting redundancy handling device may comprise a processor acting on computer instructions causing the transmitting redundancy handling device to perform the activities of the transmitting redundancy handling function. The combination of processor and computer instructions may together implement the transmitting redundancy handling function.

The receiving redundancy handling device may comprise a processor acting on computer instructions causing the receiving redundancy handling device to perform the activities of the receiving redundancy handling function. The combination of processor and computer instructions may together implement the receiving redundancy handling function.

The discarding of the first IPv6 packet or the second IPv6 packet may be the discarding of the first or the second IPv6 packet, whichever is received later than the other. The one of the first and the second IPv6 packet that is discarded may thus be the packet that is received after the other.

According to one variation of the first aspect, the first and the second IPv6 packets each comprise an IPv6 routing header indicating intermediate nodes of the automation system that the IPv6 packets are to pass when travelling from the transmitting to the receiving redundancy handling device and the transmitting redundancy handling function is further configured to ensure that all intermediate nodes specified in the first and the second IPv6 packet differ from each other.

According to a corresponding variation of the second aspect, the first and the second IPv6 messages each comprise an IPv6 routing header indicating intermediate nodes of the automation system that the IPv6 packets are to pass when travelling from the transmitting to the receiving redundancy handling device and further comprising ensuring that all intermediate nodes specified in the first and the second IPv6 packet differ from each other.

According to one variation of the first aspect the transmitting redundancy handling function is configured to generate the first and the second IPv6 packets. In this case the transmitting redundancy handling function may generate the packets with an IPv6 destination option header and optionally also with an IPv6 routing header. If there is an IPv6 routing header, the ensuring may comprise the transmitting redundancy handling function setting different nodes in the IPv6 routing header of the first and second IPv6 packets.

According to a corresponding variation of the second aspect, the method may further comprise generating the first and the second IPv6 packets. In this case the generating of the IPv6 packets may be the generating of the packets with an IPv6 destination option header and optionally also with an IPv6 routing header. If there is an IPv6 routing header, the ensuring may additionally comprise setting different nodes in the IPv6 routing header of the first and second IPv6 packets.

According to yet another variation of the first aspect, the first communication protocol packet is obtained through being generated by the transmitting redundancy handling function and the second communication protocol packet is obtained based on copying at least the automation application data of the first communication protocol packet.

According to a corresponding variation of the second aspect, the obtaining of the first communication protocol packet comprises generating the first communication protocol packet and the obtaining of the second communication protocol packet comprises copying at least the automation application data of the first communication protocol packet.

The first communication protocol packet may comprise a payload that comprises the automation application data and the sequence number. The copying may involve copying this payload or alternatively the whole first communication protocol packet.

In the above-mentioned variations, it is additionally possible that the first IPv6 packet is generated with the first communication protocol packet and that the generation of the second IPv6 packet comprises generating the second communication protocol packet through copying at least the automation application data of the first communication protocol packet into the second communication protocol packet.

It is additionally possible that the first and second IPv6 packets are addressed to the receiving redundancy handling device using different IPv6 destination addresses and take different communication paths to the receiving redundancy handling device.

The transmitting redundancy handling device and the receiving redundancy handling device may be endpoint devices, i.e. devices that are end points of the automation application data and in which applications are running that use the automation application data. The endpoint devices may thus be automation devices that need to exchange automation application data with each other, such as controllers, for instance controlling one or more field devices. Alternatively, the transmitting redundancy handling device and the receiving redundancy handling device may be devices handing redundancy for the endpoint devices. They may for instance be interface devices, i.e. devices that are interfaces to the first and second system areas.

According to another variation of the first aspect, the first and the second communication protocol packets are received from a first endpoint device, are intended for a second endpoint device connected to the receiving redundancy handling device and placed in the payloads of the first and the second IPv6 packet.

According to a corresponding variation of the second aspect, the first and the second communication protocol packets are received from a first endpoint device and are intended for a second endpoint device connected to the receiving redundancy handling device, and further comprising placing the first communication protocol packet in a payload of the first IPv6 packet, extracting the sequence number from the second communication protocol packet and placing the second communication protocol packet in a payload of the second IPv6 packet.

The first and the second communication protocol packets may be received in a first and a second original IP packet and the first and the second communication protocol packets or even the whole original IP packets may be tunneled in the payloads of the first and the second IPv6 packets. Also the first and second original IP packets are Internet Protocol packets in the Internet Layer of the TCP/IP model or network protocol packets in the Network Layer of the OSI model.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

Aspects of the present disclosure will now be described more fully hereinafter with reference to the accompanying drawings, in which certain embodiments are shown.

These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
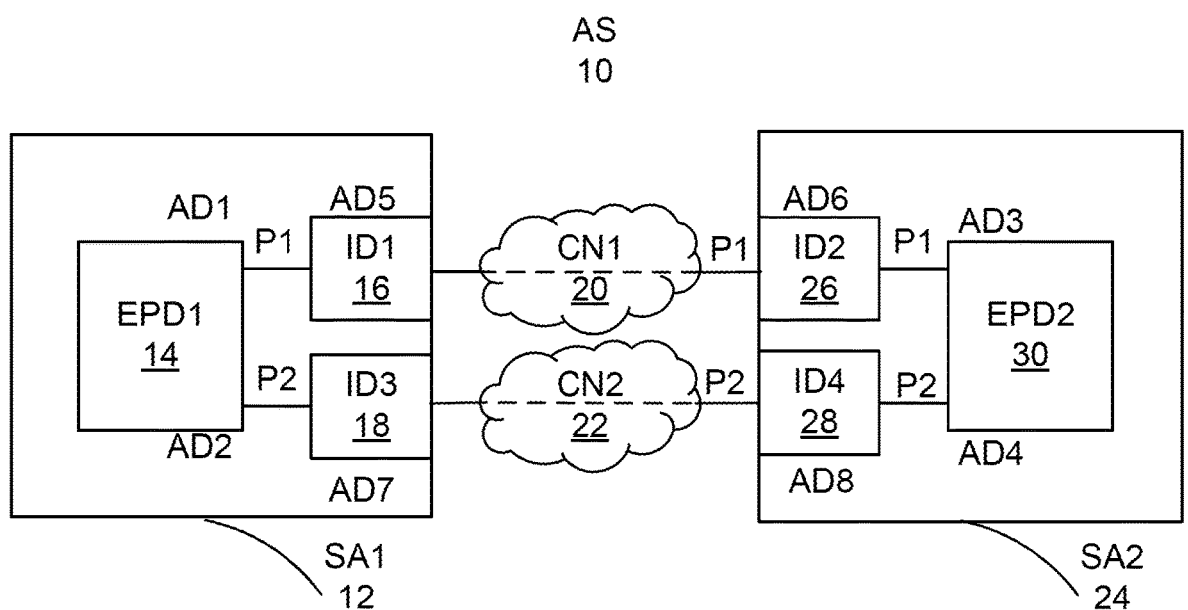
FIG. 1 is a diagram schematically illustrating a first embodiment of an automation system comprising a first and a second system area interconnected by a first and a second communication network, FIG. 2 schematically shows a realization of a first endpoint device in the first system area, FIG. 3 schematically shows a realization of a second endpoint device in the second system area, FIG. 4 schematically shows a first and a second IPv6 packet sent from the first to the second endpoint device, FIG. 5 schematically shows a flow chart of a number of method steps in a first embodiment of a method of handling redundancy for packets transmitted from the first system area to the second system area, FIG. 6 schematically shows a flow chart of a number of method steps in a first embodiment of a method of handling redundancy for packets received in the second system area from the first system area.

FIG. 1 is a diagram schematically illustrating a first embodiment of an automation system AS 10 comprising a first system area SA1 12 and a second system area SA2 24. In the first system area 12 there is a first endpoint device EPD1 14 and in the second system area 24 there is a second endpoint device EPD2 30. In the first system area 12 there is also a first interface device ID1 16 and a third interface device ID3 18, while in the second system area 24 there is a second interface device ID2 26 and a fourth interface device ID4 28. The interface devices 16, 18, 26, 28 are interfaces of the system areas 12, 24 to communication networks used for communication between automation devices and may as an example be realized as routers. However, they may also be gateways. A system area has a logically flat system structure without internal routers, but with interface devices, such as routers or gateways, for external communication out of the system area.

The first endpoint device 14 has a first IP address AD1 as well as a second IP address AD2, which are both IPv6 addresses, where IP is an acronym for Internet Protocol and IPv6 is an abbreviation for Internet Protocol version 6. In a similar manner the second endpoint device 30 has a third IP address AD3 as well as a fourth IP address AD4, which are likewise both IPv6 addresses. The first interface device 16 in turn has a fifth IP address AD5, the second interface device 26 has a sixth IP address, AD6, the third interface device 18 has a seventh IP address AD7 and the fourth interface device 28 has an eighth IP address AD8. These addresses are likewise all IPv6 addresses.

The first interface device 16 communicates with the second interface device 26 via a first communication network CN1 20 and the third interface device 18 communicates with the fourth interface device 28 via a second communication network CN2 22. The first endpoint device 14 sends a first IPv6 packet P1 to the second endpoint device 30 in a first communication path that goes from the first endpoint device 14 to the second endpoint device 30 via the first and the second interface devices 16, 26 and the first communication network 20. The first endpoint device 14 also sends a second IPv6 packet P2 to the second endpoint device 30 in a second communication path that goes from the first endpoint device 14 to the second endpoint device 30 via the third and the fourth interface devices 18, 28 and the second communication network 22. The first and second IPv6 packets are thereby Internet Protocol packets in the Internet Layer of the Transmission Control Protocol/Internet Protocol (TCP/IP) model or network protocol packets in the Network Layer of the Open Systems Interconnection (OSI) model. It should here be realized that as an alternative there may be no second communication network but only the first communication network, to which the interface devices are all connected and through which both paths pass.

Figure 2:
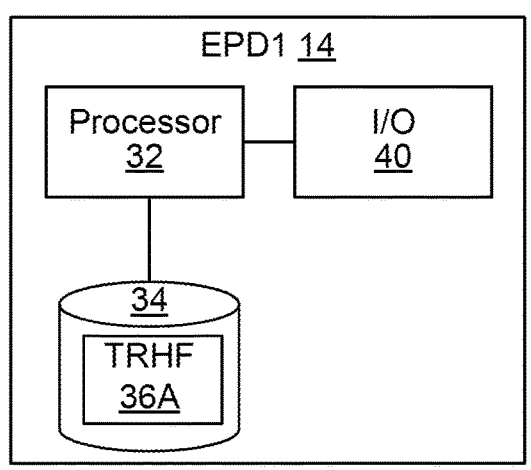

FIG. 2 schematically shows a variation of the first endpoint device EPD1 14. It comprises a first processor 32 connected to a first memory 34 with computer instructions implementing a first version of a transmitting redundancy handling function TRHF 36A. The computer instructions may be computer program code of a computer program, where the computer program code implements the first version of the transmitting redundancy handling function 36A when being run by the first processor 32. The memory 34 may also be considered to be a data carrier with the computer program code used to implement the first version of the transmitting redundancy handling function 36A. In this case the data carrier with computer program code implementing the first version of the transmitting redundancy handling function 36A may also be considered to form a computer program product.

The first endpoint device 14 also comprises a first Input/Output interface I/O 40 for communicating with other devices such as the first and third interface devices 16, 18.

Figure 3:
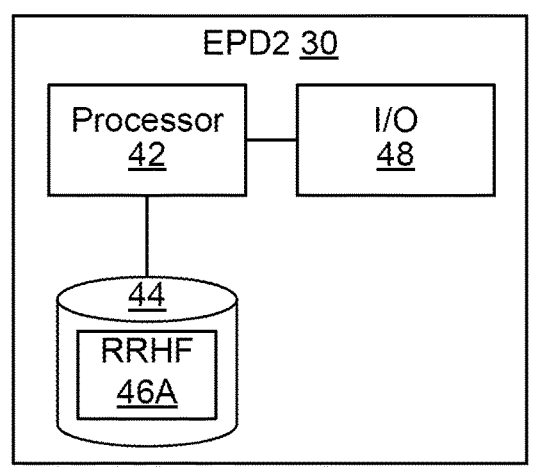

FIG. 3 schematically shows a variation of the second endpoint device EPD2 30. It comprises a second processor 42 connected to a second memory 44 with computer instructions implementing a first version of a receiving redundancy handling function RRHF 46A. The memory 44 may also be considered to be a data carrier with the computer program code used to implement the first version of the receiving redundancy handling function 46A. In this case the data carrier with computer program code implementing the first version of the receiving redundancy handling function 46A may also be considered to form a computer program product. The second endpoint device 30 also comprises a second Input/Output interface I/O 48 for communicating with other devices such as the second and the fourth interface devices 26, 28.

The first and second endpoint devices 14 and 30 may need to communicate with each other. It is additionally possible that the first and second endpoint devices 14, 30 run critical automation applications that require deterministic and reliable data exchange between each other, which may for instance be the case if they are both controllers. It is thus possible that the first endpoint device 14 is a first controller controlling one or more field devices in or connected to the first system area 12 and that the second endpoint device 30 is a second controller controlling one of more field devices in or connected to the second system area 24. As a part of providing such deterministic and reliable communication, the communication may need to be redundant in that communication is made via the two paths between the first and the second endpoint device 14, 30 in the first and the second system areas 12, 24.

These system areas 12, 24 may have IP addresses provided by a connectivity server, which IP addresses are traditionally IPv4 addresses that are local addresses used in the system area. Traditional redundancy schemes such as PRP and HSR are performed in layer 2 of the OSI model and do as such not survive the leaving of the system area in which the data originates.

Aspects of the present disclosure are directed towards providing redundancy for traffic between the first and the second endpoint device using a transmitting redundancy handling device in the first system area for communicating with a receiving redundancy handling device in the second system area, where in the first embodiment the first endpoint device is such a transmitting redundancy handling device that comprises the transmitting redundancy handling function and the second endpoint device is such a receiving redundancy handling device that comprises the receiving redundancy handling function.

Figure 4:
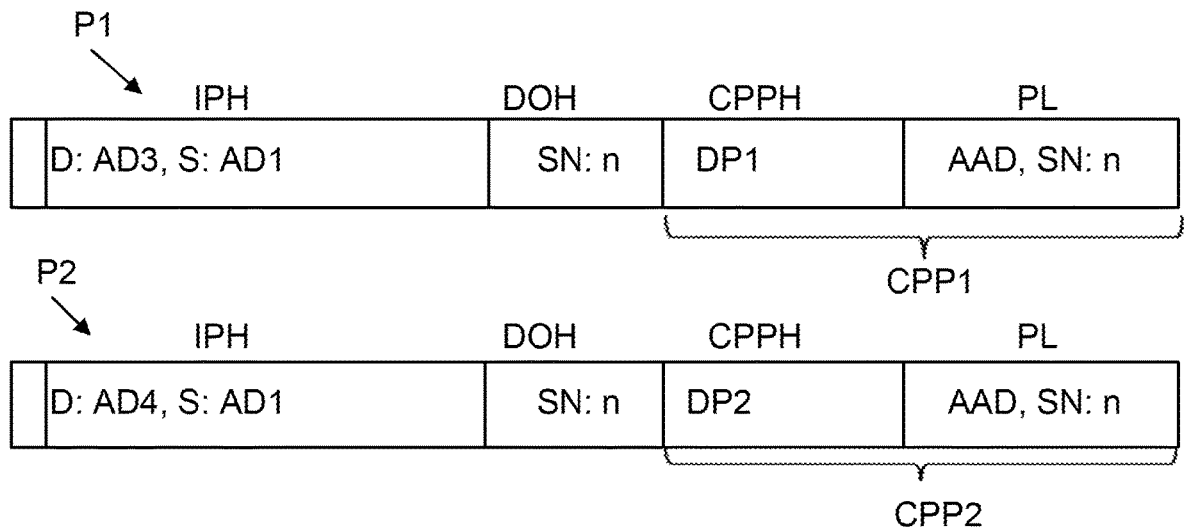
Figure 5:
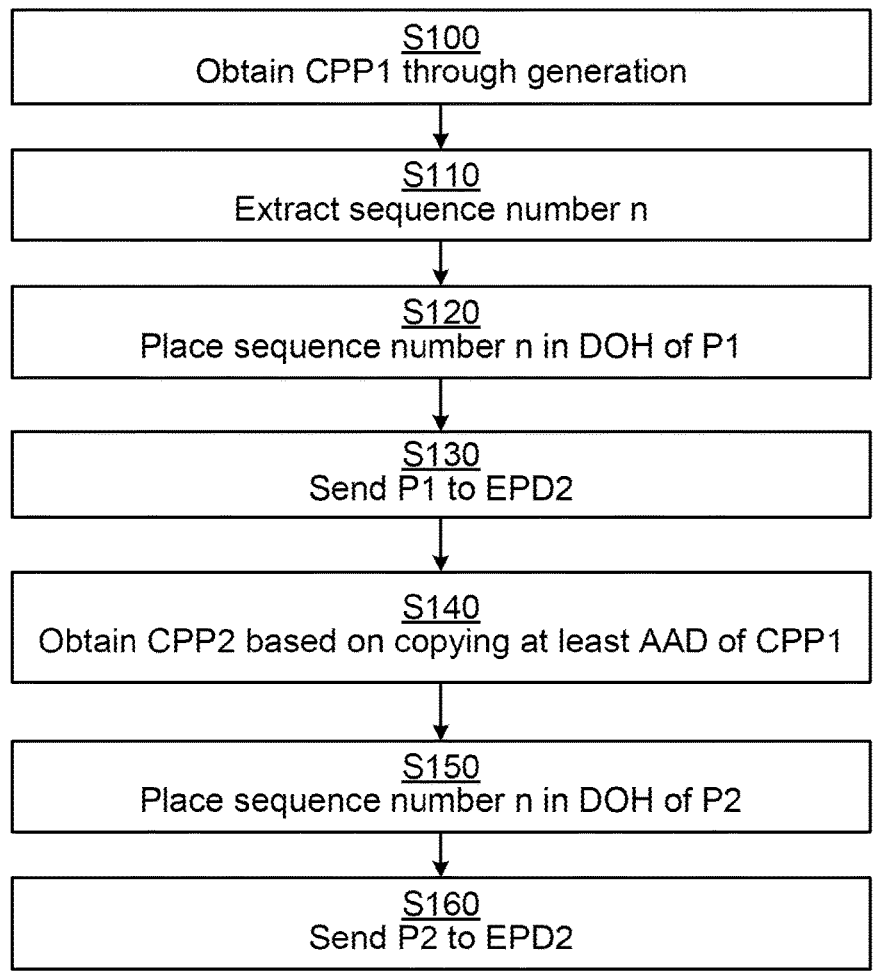
Figure 6:
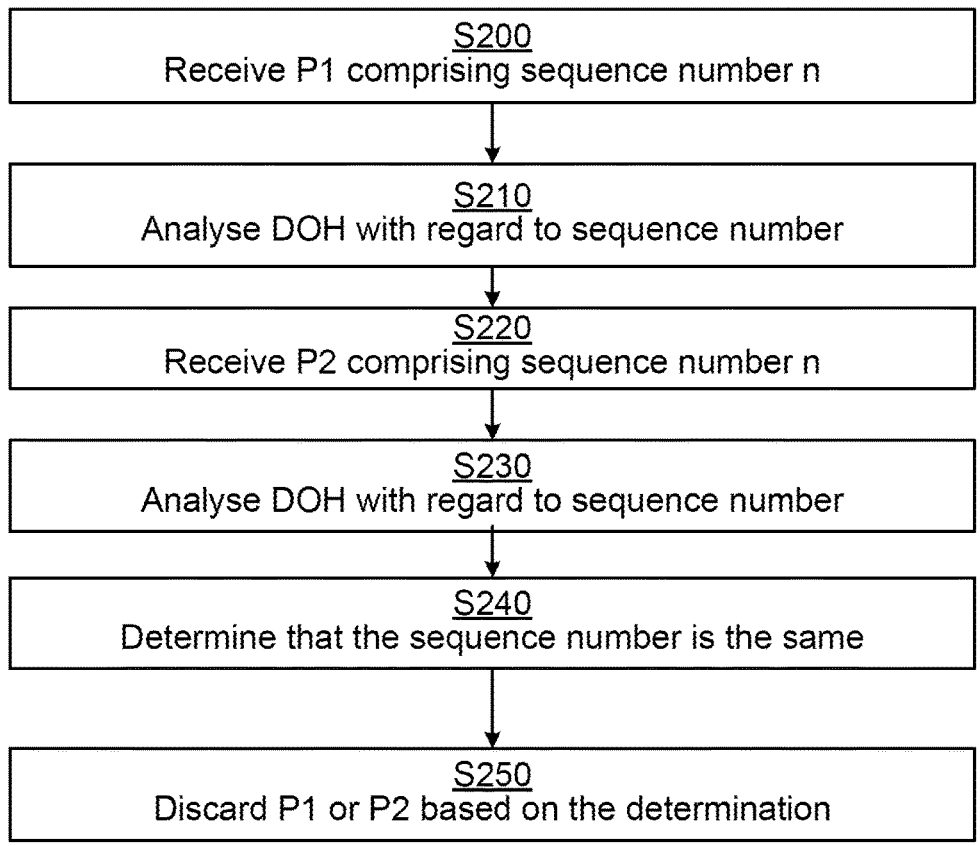

How this redundancy is being implemented in the first embodiment will now be disclosed with reference also being made to FIGS. 4, 5 and 6, where FIG. 4 schematically shows the first and the second IPv6 packet P1, P2 sent from the first to the second endpoint device 14, 30, FIG. 5 schematically shows a flow chart of a number of method steps in a first embodiment of a method of handling redundancy for packets transmitted from the first system area 12 to the second system area 24 and FIG. 6 schematically shows a flow chart of a number of method steps in a first embodiment of a method of handling redundancy of packets received in the second system area 24 from the first system area 12.

Here it is assumed that the first endpoint device 14 sends redundant data to the second endpoint device 30. For this it only needs to use the first IP address AD1 and not the second IP address AD2. The second IP address AD2 may be employed if the first endpoint device 14 is to receive redundant data from the second endpoint device 30. The first endpoint device more particularly forms one endpoint and the second endpoint device 30 forms another endpoint of automation data communicated between the first and second system areas 12, 24. In this embodiment the first endpoint device 14 is also a first endpoint of the first and second communication paths and the second endpoint device 30 is a second endpoint of the first and second communication paths. Furthermore, in this first embodiment the first endpoint device 14 is also a transmitting redundancy handling device, while the second endpoint device 30 is a receiving redundancy handling device, where the transmitting redundancy handling device handles redundancy for transmissions made out from the first system area 12 and the receiving redundancy handling device handles redundancy for transmissions received in the second system area 24. The transmitting redundancy handling device with the transmitting redundancy handling function is a redundancy handling device and a redundancy handling function on a transmitting side of the first and the second communication paths, while the receiving redundancy handling device with the receiving redundancy handling function is a redundancy handling device and a redundancy handling function on a receiving side of the first and the second communication paths. The first endpoint device 14 is in this case a combined automation application data generation and transmitting redundancy handling device, while the second endpoint device 30 is a combined automation application data reception and receiving redundancy handling device.

There may be a first automation application running in the first endpoint device 14, which first automation application may need to send data to a corresponding second automation application running in the second endpoint device 30. This data will in the following be referred to as automation application data AAD. When the first endpoint device 14 has automation application data AAD that it needs to provide redundantly to the second endpoint device 30, the transmitting redundancy handling function 36A obtains a first communication protocol packet CPP1, S100, which obtaining is done through generating the first communication protocol packet CPP1. In automation applications the communication protocol is typically User Datagram Protocol (UDP) and therefore the communication protocol packet may be a UDP packet having a UDP header with a first destination port number DP1 and a payload PL comprising the automation application data AAD that needs to be sent to the second endpoint device. The first communication protocol packet CPP1 typically also has a sequence number n, which sequence number is associated with the automation application data AAD and is typically also placed in the payload PL. The first communication protocol packet CPP1 thus has automation application data AAD for which redundancy is to be provided and a sequence number n linked to the automation application data.

After having obtained the first communication protocol packet CPP1 in this way, the transmitting redundancy handling function 36A extracts the sequence number n from the first communication protocol packet CPP1, S110. Furthermore, the transmitting redundancy handling function 36A generates a first IPv6 packet P1 intended for the second endpoint device 30 acting as a receiving redundancy handling device, where the first IPv6 packet P1 may be generated with the first communication protocol packet CCP1. The first IPv6 packet P1 has an IPv6 header comprising a destination address and a source address. The destination address is in this case the third IP address AD3 of the second endpoint device 30, while the source address is the first IP address AD1 of the first endpoint device 14. The packet P1 also comprises an extension header in the form of a IPv6 destination option header DOH. The first IPv6 packet is thus generated with an IPv6 destination option header DOH. Moreover, the transmitting redundancy handling function 36A inserts or places the extracted sequence number n in the destination option header DOH of the first IPv6 packet P1 that is to be sent to the second endpoint device 30, S120. The presence of the destination option header DOH is indicated through the field immediately preceding the destination option header DOH comprising a predefined character combination, which in the present case is the character combination of 60. Therefore, the transmitting redundancy handling function 36A also inserts the character combination at the end of the field that precedes the destination option header DOH. As was mentioned above, the first IPv6 packet P1 is also to comprise the first communication protocol packet CPP1. The first communication protocol packet CPP1 may be provided as a payload of the first IPv6 packet P1.

After the first IPv6 packet P1 has been generated in this way, it is then sent to the receiving redundancy handling device, S130, which in this case is to the second end point device 30, which sending is made in the first communication path that goes to the second endpoint device 30 via the first and the second interface devices 16, 26 and the first communication network 20.

The transmitting redundancy handling function also generates a second IPv6 packet P2 with an IPv6 destination option header DOH. In order to do this it obtains a second communication protocol packet CPP2 having the same automation application data AAD and the same sequence number n, S140, which second communication protocol packet P2 is to be a part of the second IPv6 packet P2 intended for the receiving redundancy handling device. The second IPv6 packet is thus also to comprise the second communication protocol packet. The obtaining is in this case done based on copying at least the automation application data AAD of the first communication protocol packet CPP1. The generating of the second IPv6 packet P2 may comprise generating the second communication protocol packet CPP2 through copying at least the automation application data AAD of the first communication protocol packet CPP1 into the second communication protocol packet CPP2. It is possible that the whole payload PL of the first communication protocol packet CPP1 and even that the whole first communication protocol packet CPP1 is copied for obtaining the second communication protocol packet CPP2. It is also possible that another second destination port number DP2 is used in the header of the second communication protocol packet P2. The used communication protocol is therefore also here UDP. The transmitting redundancy handling function 36A then inserts or places the sequence number n in the destination option header DOH of the second IPv6 packet P2, S150, which sequence number may be the sequence number extracted from the first communication protocol packet CPP1 or a sequence number that is extracted from the second communication protocol packet CPP2. The generated second IPv6 packet P2 has an IPv6 header comprising a destination address and a source address. The destination address is this case the fourth IP address AD4 of the second endpoint device 30, while the source address is again the first IP address AD1 of the first endpoint device 14. As was mentioned above, the second IPv6 packet P2 comprises a destination option header DOH, which comprises the sequence number n that is the same as the sequence number in the destination option header DOH of the first IPv6 packet P1. The presence of the destination option header is again indicated through the field immediately preceding the destination option header DOH comprising a predefined character combination, which again is the character combination of 60. Therefore, the transmitting redundancy handling function 36A also inserts the character combination at the end of the field that precedes the destination option header. The second communication protocol packet CPP2 is then placed as a payload of the second IPv6 packet.

After the second IPv6 packet P2 has been generated in this way, it is then sent to the receiving redundancy handling device, S160, which in this embodiment is the second end point device 30. The sending is made in the second communication path that goes to the second endpoint device 30 via the third and the fourth interface devices 18, 28 and the second communication network 22.

When the first endpoint device sends data packets to the corresponding second endpoint device, it thus duplicates the automation application data and inserts the sequence number in the IPv6 destination option header, which s used to carry information that only needs to be examined by the destination node of the IPv6 packet. It can also be seen that the first endpoint device 14 then sends the two IPv6 packets in two different OSI layer 3 paths.

The first and second communication protocol packets are also transport protocol packets in the transport layer of the TCP/IP or OSI models. Furthermore, it is possible that another protocol than UDP is used, such as Stream Control Transmission Protocol (SCTP).

It is assumed that the IPv6 addresses are pre-configured by a network management protocol or using protocols such as Domain Name Server (DNS). In either case the corresponding devices can get each other interface indentities from the IPv6 addresses themselves.

It can thereby be seen that the first and second IPv6 packets P1, P2 are addressed to the receiving redundancy handling device using different IPv6 destination addresses and take different communication paths to the receiving redundancy handling device.

In the second endpoint device 30 acting as a receiving redundancy handling device, the receiving redundancy handling function 46A receives the first IPv6 packet P1 that comprises the automation application data AAD and the destination option header DOH with the sequence number n associated with the automation application data AAD from the first endpoint device 14 acting as a transmitting redundancy handling device, S200. The receiving redundancy handling function 46A then locates the destination option header DOH through detecting the preceding pre-defined character combination and then analyses this destination option header DOH of the first IPv6 packet P1 with regard to sequence number, S210. It thus detects the sequence number n that has been inserted in the destination option header DOH of the first IPv6 packet P1.

The receiving redundancy handling function 46A also receives the second IPv6 packet P2 from the first endpoint device 14 acting as a transmitting redundancy handling device, which packet P2 comprises the same automation application data AAD and a destination option header with the same sequence number n, S220. It also locates the destination option header DOH, which is done in the same way as with the first IPv6 packet P1, and then analyses this destination option header DOH of the second IPv6 packet P2 with regard to sequence number, S230. It thus detects the sequence number that has been inserted in the destination option header DOH of the second IPv6 packet P2. The receiving redundancy handling function 46A thereafter determines that the sequence number n is the same in the first and the second IPv6 packet P1 and P2, S240, and then discards the first IPv6 packet or the second IPv6 packet based on the determination, S250. The discarding of the first IPv6 packet P1 or the second IPv6 packet P2 may be the discarding of the first or the second IPv6 packet, whichever is received later than the other. The one of the first and the second IPv6 packet that is discarded may thus be the packet that is received after the other. Based on the finding that the sequence number is the same in the first and the second IPv6 packets P1, P2, the receiving redundancy handling function 46A thus discards one of the two packets, which may be the one that is received after the other. The automation application data AAD of the other retained IPv6 packet is in turn provided to the second automation application in the second endpoint device 30.

When an IPv6 packet is received at the second endpoint device 30, the second endpoint device 30 thus determines if it has already received an IPv6 packet with the same source address and sequence number. If it has, then it discards the packet otherwise it processes the automation application data.

It can thereby be seen that the endpoint devices perform duplication and elimination of IPv6 packet (which contain the automation application data) and achieve end to end seamless network redundancy by utilizing IPv6 destination option extension header.

Thus, the second endpoint device 30 receives redundant packets with the automation application data AAD from the first endpoint device, which thus increases the reliability of the data transfer. This reliability is increased by the use of completely separated paths between the endpoint devices. Furthermore, through the use of IPv6, these packets can be sent without address translations. Moreover, as the sequence number is placed in the destination option header, the redundant or superfluous packet can be quickly discarded merely through investigating this destination option header. Time is thereby saved in the further processing of the packet, if it is a duplicate. There is thus no need for analysing the communication protocol packet or its payload, which may involve more and slower processing.

Figure 7:
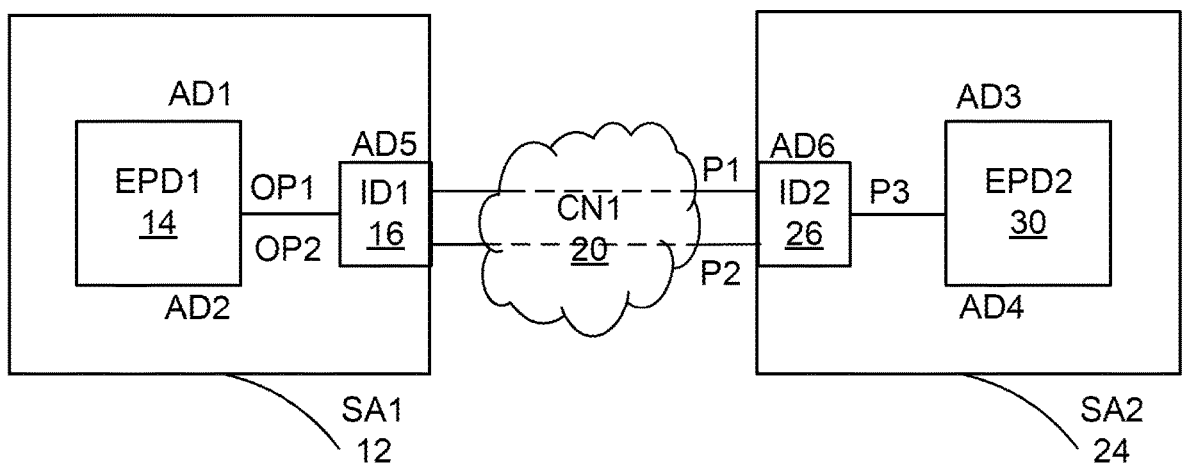
FIG. 7 is a diagram schematically illustrating a second embodiment of the automation system comprising the first and the second system area interconnected by the first communication network, FIG. 8 schematically shows a realization of a first interface device in the first system area, FIG. 9 schematically shows a realization of a second interface device in the second system area, FIG. 10 schematically shows a first original IP packet sent from the first endpoint device to the first interface device, a first IPv6 packet sent from the first interface device to the second interface device and a third packet sent from the third interface device to the second endpoint device, FIG. 11 schematically shows a second original IP packet sent from the first endpoint device to the first interface device and a second IPv6 packet sent from the first interface device to the second interface device, FIG. 12 schematically shows a flow chart of a number of method steps in a second embodiment of the method of handling redundancy for packets transmitted from the first system area to the second system area, FIG. 13 schematically shows a flow chart of a number of method steps in a second embodiment of the method of handling redundancy for packets received in the second system area from the first system area.

FIG. 7 schematically illustrates a second embodiment of the automation system 10, which comprises the first system area SA1 12 and the second system area SA2 24 with the first endpoint device EDP1 14 and the second endpoint device EPD2 30. The first system area 12 also comprises the first interface device ID1 16 and the second system area 24 comprises the second interface device ID2 26. However, in this second embodiment the third and the fourth interface devices are omitted. The first endpoint device 14 has the first IP address AD1 and the second IP address AD2, which may again both be IPv6 addresses. However, they may also be IPv4 addresses. As before the second IP address AD2 may also be omitted. In a similar manner the second endpoint device 30 has the third IP address AD3 as well as the fourth IP address AD4, which may likewise both be, but are not limited to IPv6 addresses. Also the fourth IP address may be omitted. The first interface device 16 again has the fifth IP address AD5 and the second interface device 26 has the sixth IP address AD6, which are IPv6 addresses. It is here possible that the second interface device 26 has a further IP address.

The first interface device 16 communicates with the second interface device 26 via a first communication path through the first communication network CN1 20 as well as via a second communication path through the first communication network CN1 20. As can be seen the first endpoint device 14 sends a first original IP packet OP1 and a second original IP packet OP2 to the first interface device 16, which in turn sends the first IPv6 packet P1 to the second interface device 26 via the first communication path and the second IPv6 packet P2 to the second interface device 26 via the second communication path. The second interface device 26 also sends an IP packet, for instance a third IPv6 packet P3, to the second endpoint device 30.

Figure 8:
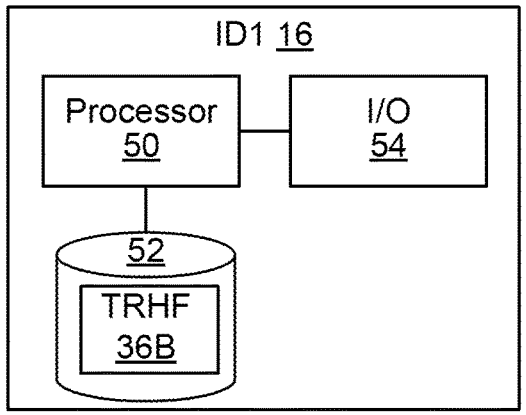

FIG. 8 schematically shows a variation of the first interface device ID1 16. It comprises a third processor 50 connected to a third memory 52 with computer instructions implementing a second version of the transmitting redundancy handling function TRHF 36B. The computer instructions may be computer program code of a computer program, where the computer program code implements the second version of the transmitting redundancy handling function 36B when being run by the third processor 50. The third memory 52 may also be considered to be a data carrier with the computer program code used to implement the second version of the transmitting redundancy handling function 36B. In this case the data carrier with computer program code implementing the second version of the transmitting redundancy handling function 36B may also be considered to form a computer program product.

The first interface device 16 also comprises a third Input/Output interface I/O 54 for communicating with other devices such as the first endpoint device 14.

Figure 9:
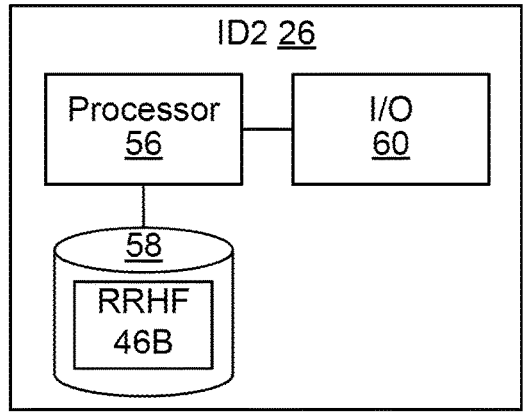

FIG. 9 schematically shows a variation of the second interface device ID2 26. It comprises a fourth processor 56 connected to a fourth memory 58 with computer instructions implementing a second version of the receiving redundancy handling function RRHF 46B. The combination of fourth processor 56 and fourth memory 58 is one realization of hardware used to implement the second version of the receiving redundancy handling function 46B. The fourth memory 58 may also be considered to be a data carrier with the computer program code used to implement the second version of the receiving redundancy handling function 46B. In this case the data carrier with computer program code implementing the second version of the receiving redundancy handling function 46B may also be considered to form a computer program product. The second interface device 26 also comprises a second Input/Output interface I/O 60 for communicating with other devices such as the second endpoint device 30.

The first and second endpoint devices 14, 30 may in this case also be controllers needing to communicate with each other. They may also able to generate duplicate data packets, for instance according to the PRP protocol. However, they may not be able to handle duplicate packets in a simple and efficient fashion.

In this second embodiment, the first endpoint device 14 is an automation application data generation device, the second endpoint device 30 is an automation application data reception device, the first interface device 16 is a transmitting redundancy handling device in the first system area 12 and the second interface device 26 is a receiving redundancy handling device in the second system area 24, where the first interface device 16 comprises the second version of the transmitting redundancy handling function 36B and the second interface device 26 comprises the second version of the receiving redundancy handling function 46B, which functions together allow such redundancy to be implemented.

Figure 10:
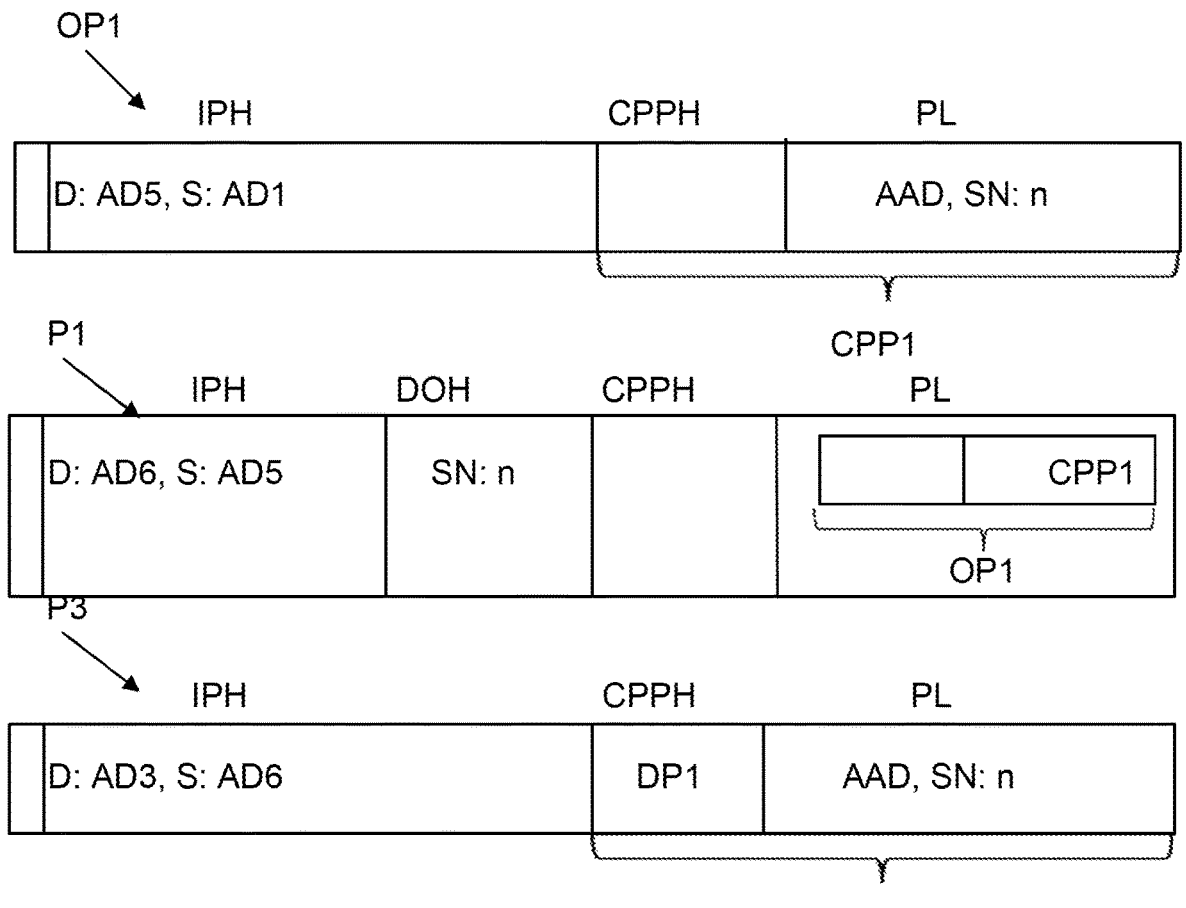
Figure 11:
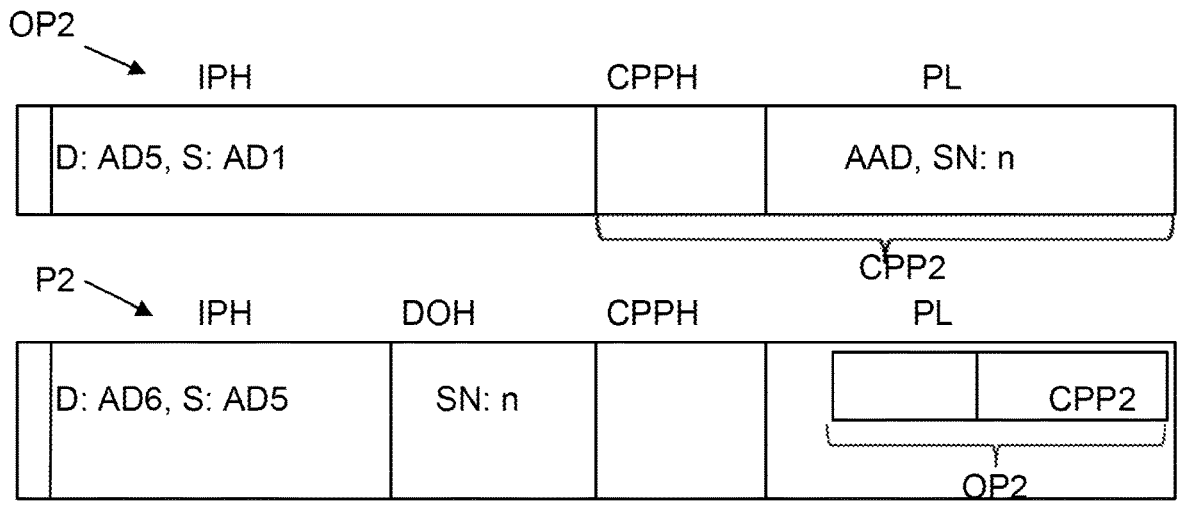
Figure 12:
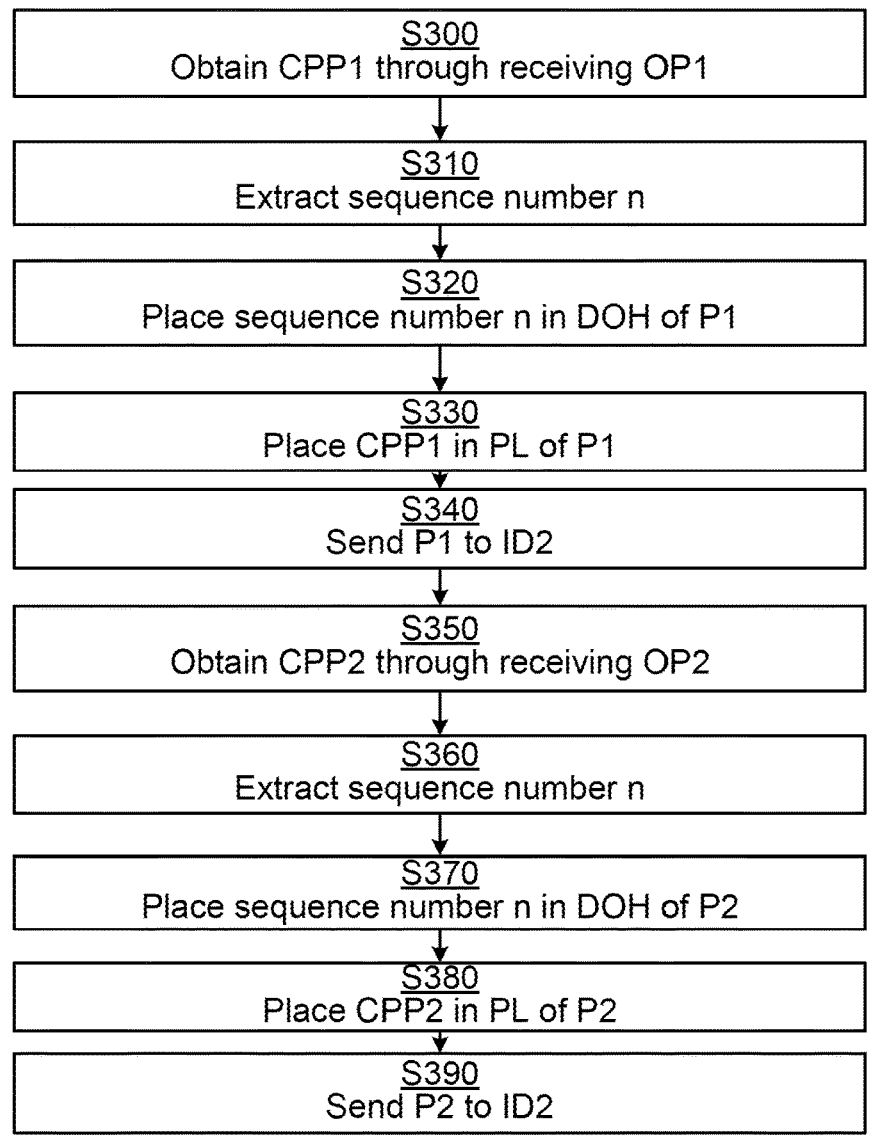
Figure 13:
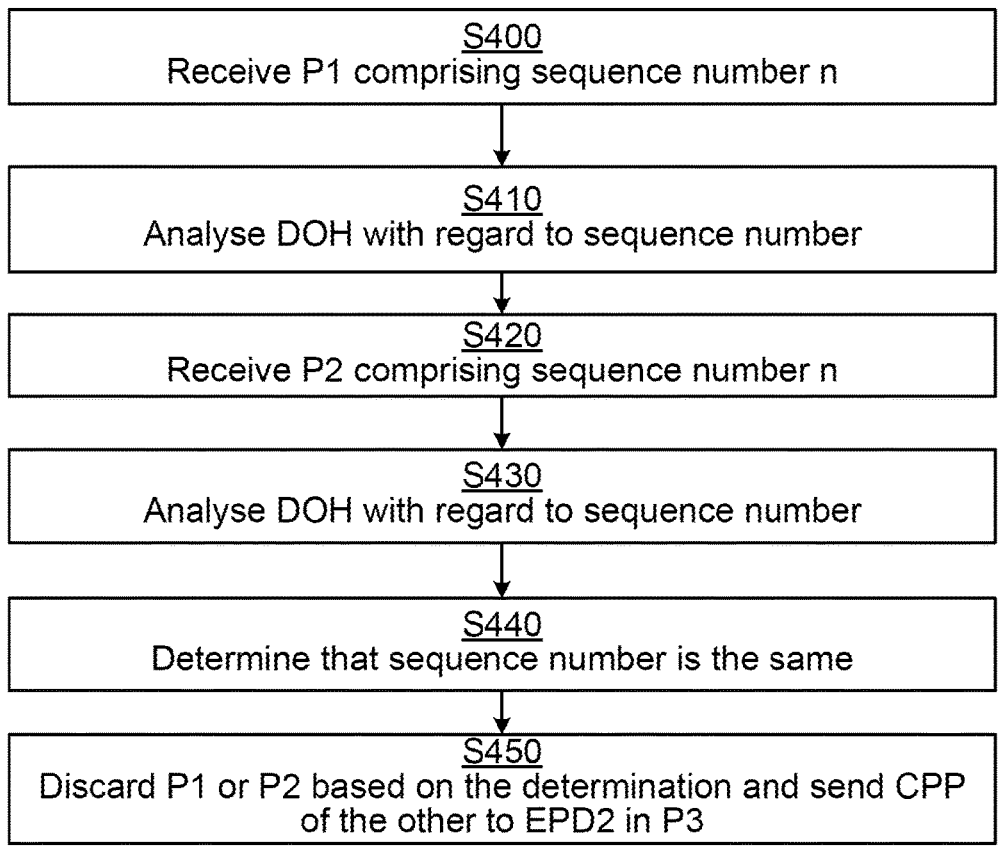

How this redundancy is being implemented in the second embodiment will now be disclosed with reference also being made to FIGS. 10, 11, 12 and 13, where FIG. 10 schematically shows the first original IP packet OP1 sent from the first endpoint device 14 to the first interface device 16, the first IPv6 packet P1 sent from the first interface device 16 to the second interface device 26 and the third packet P3 sent from the second interface device 26 to the second endpoint device 30, FIG. 11 schematically shows the second original IP packet OP2 sent from the first endpoint device 14 to the first interface device 16 and the second IPv6 packet P2 sent from the first interface device 16 to the second interface device 26, FIG. 12 schematically shows a flow chart of a number of method steps in a second embodiment of the method of handling redundancy for packets transmitted from the first system area 12 to the second system area 24 and FIG. 13 schematically shows a flow chart of a number of method steps in a second embodiment of the method of handling redundancy for packets received in the second system area 24 from the first system area 12.

Here it is assumed that the first endpoint device 14 sends redundant data to the second endpoint device 30, for instance in PRP frames. For this it only needs to use the first IP address AD1 and not the second IP address AD2. It is additionally possible that the second endpoint device 30 only uses the third IP address AD3. The first endpoint device 14 is here a first endpoint and the second endpoint device 30 is a second endpoint of automation application data communicated between the first and second system areas 12, 24. However, in this case the first interface device 16 is a transmitting redundancy handling device, while the second interface device 26 is a receiving redundancy handling device. The first and second interface devices 16 and 26 may be routers, like in the first embodiment. However, it is also or instead possible that they are gateways or connection servers. It is also possible that a transmitting redundancy handling device and a receiving redundancy handling device are separate devices that are connected between an endpoint device and a corresponding interface device, such as a router or a gateway.

When the first endpoint device 14 has data that it needs to provide redundantly to the second endpoint device 30, it sends the first and the second original IP packets OP1, OP2 to the first interface device 16 that acts as a transmitting redundancy handling device. The first and second original IP packets OP1, OP2, which are also Internet Protocol packets in the Internet Layer of the TCP/IP model or network protocol packets in the Network Layer of the OSI model, are thus addressed to the transmitting redundancy handling device, where the first original packet IP OP1 comprises an IP header IPH with the first address AD1 of the first endpoint device 14 as the source address and the fifth address AD5 of the first interface device 16 acting as a transmitting redundancy handling device as destination address. It also comprises the first communication protocol packet CPP1 with a payload PL that comprises the automation application data AAD, which in this case comprises application data together with PRP data, such as a redundancy control trailer. There is also a sequence number n in the redundancy control trailer that is associated with the automation application data AAD. The second original IP packet OP2 with redundant automation application data in a similar manner comprises an IP header IPH with the first address AD1 of the first endpoint device 14 as the source address and the fifth address AD5 of the first interface device 16 acting as a transmitting redundancy handling device as destination address. The second original IP packet OP2 also comprises a second communication protocol packet CPP2 with a payload PL comprising the automation application data AAD together with a PRP trailer. There is also the same sequence number n that is associated with the automation application data AAD, which sequence number n is placed in the PRP trailer of the second communication protocol packet CCP2.

As the automation application data AAD of the first and the second original IP packets OP1, OP2 is destined for the second system area 24, the packets will be received by the first interface device 16 and more particularly by the transmitting redundancy handling function 36B of the first interface device 16, which thereby obtains the first communication protocol packet CCP1 through receiving the first original IP packet OP1, S300, which first communication protocol packet CPP1 comprises automation application data AAD for which redundancy is to be provided and a sequence number n linked to the automation application data.

After having received the first communication protocol packet CPP1, the transmitting redundancy handling function 36B starts operation in a first processing path in which it first extracts the sequence number n from the first communication protocol packet, S310, and more particularly from the PRP trailer of the first communication protocol packet CPP1. Also in this second embodiment the transmitting redundancy handling function 36B generates the first IPv6 packet P1 with an IPv6 destination option header. The packet P1 is intended for or to be sent to the receiving redundancy handling function 46B of the second interface device 26 acting as receiving redundancy handling device. The first IPv6 packet P1 has an IPv6 header comprising a destination address and a source address. The destination address is in this case the sixth IP address AD6 of the second interface device 26, while the source address is the fifth IP address AD5 of the first interface device 16. The first IPv6 packet P1 also comprises the destination option header DOH, which is also here indicated through the field immediately preceding the destination option header DOH comprising a predefined character combination, here 60. Thereafter the transmitting redundancy handling function 36B inserts or places the sequence number n in the destination option header DOH of the first IPv6 packet P1 intended for the receiving redundancy handling device, S320. The first IPv6 packet is also to comprise the first communication protocol packet CPP1. Therefore, the first communication protocol packet CPP1 is placed in the payload PL of the first IPv6 packet P1, S330. Thereby the PRP packet is tunneled in the first IPv6 packet P1. It is here possible that the complete first original IP packet OP1 is tunneled in the payload.

After the first IPv6 packet P1 has been generated in this way, the first processing path is finished by the transmitting redundancy handling function 36B sending it to the second interface device 26 acting as a receiving redundancy handling device, S340. The sending is made to the second interface device 26 in the first communication path through the first communication network 20.

The transmitting redundancy handling function 36B also obtains the second communication protocol packet CPP2 having the same automation application data AAD and the same sequence number n, S350, which in a similar manner is done through receiving the second original IP packet OP2 that comprises the second communication protocol packet CPP2. The transmitting redundancy handling function 36B then processes the second communication protocol packet CPP2 in a second processing path, which processing involves the generating of the second IPv6 packet P2 intended for second interface device 26 acting as receiving redundancy handling device with an IPv6 destination option header. The second IPv6 packet P2 is also provided with the second communication protocol packet CPP2 as well as with an IPv6 header with a destination address that is the sixth address AD6 of the second interface device 26 and a source address that is the fifth address AD5 of the first interface device 16. As mentioned above, the generated second IPv6 packet P2 also comprises the destination option header DOH. Furthermore, the transmitting redundancy handling function 36B extracts the sequence number n from the second communication protocol packet CPP2, S360, and inserts or places it in the destination option header DOH of the second IPv6 packet P2, S370. Thereby the destination option header DOH of the second IPv6 packet P2 includes the sequence number n that is the same as the sequence number in the destination option header DOH of the first IPv6 packet P1. The presence of the destination option header is indicated in the same way as in the first IPv6 packet P1. The second communication protocol packet CPP2 is also here placed as a payload of the second IPv6 packet, S380.

After the second IPv6 packet P2 has been generated in this way, the processing in the second processing path is ended through sending the second IPv6 packet P2 to the second interface device 26 acting as receiving redundancy handling device, S390, which sending is made in the second communication path through the first communication network 20.

Thereby the first endpoint device may send duplicated PRP frames to the transmitting redundancy handling device, which may be a gateway such as a connectivity server. The transmitting redundancy handling device can then tunnel the PRP frames in the IPv6 packets and insert the sequence number in the destination option header and send them via two different layer 3 paths to the receiving redundancy handling device.

It should here be realized that the second original packet OP2 may be received before the first original packet OP1 and that the transmitting redundancy handling function 36B may start to process a received packet as soon as it is being received. Therefore, the two processing paths are in fact performed independently of each other even though the method is shown as a sequence of consecutive steps.

In the second interface device 26, the receiving redundancy handling function 46B receives the first IPv6 packet P1 that comprises the automation application data AAD and destination option header DOH with the associated sequence number n from the first interface device 16 acting as a transmitting redundancy handling device, S400. It then locates the destination option header DOH through detecting the preceding pre-defined character combination and then analyses this destination option header DOH of the first IPv6 packet P1 with regard to sequence number, S410. Thereby it detects the sequence number n that has been inserted in the destination option header DOH of the first IPv6 packet P1. The receiving redundancy handling function 46B also receives the second IPv6 packet P2 that comprises the same automation application data AAD and a destination option header with the same sequence number n from the first interface device 16 acting as a transmitting redundancy handling device, S420. It also locates the destination option header DOH of this packet P2, which is done in the same way as with the first IPv6 packet P1, and then analyses this destination option header DOH of the second IPv6 packet P2 with regard to sequence number, S430. It thus also detects the sequence number that has been inserted in the destination option header DOH of the second IPv6 packet P2. It then determines that the sequence number is the same in the two IPv6 packets P1 P2 through comparing the two extracted sequence numbers, S440. Based on the determination, the receiving redundancy handling function 46A then discards the first IPv6 packet or the second IPv6 packet and sends the communication protocol packet of the other to the second endpoint device 30, S450.

The discarding of the first IPv6 packet or the second IPv6 packet may be the discarding of the first or the second IPv6 packet, whichever is received later than the other. The one of the first and the second IPv6 packet that is discarded may thus be the packet that is received after the other. The receiving redundancy handling function 46B may do this through storing the sequence number of the first received of the two IPv6 packets and discarding the other packet after identifying that it has the same sequence number. The communication protocol packet of the other non-discarded IPv6 packet is sent to the second endpoint device 30.

The communication protocol packet being sent to the second endpoint device 30 is thus the communication protocol packet in the first or second IPv6 packet P1, P2 that is received first. As an example, the first communication protocol packet CPP1 in the first IPv6 packet P1 may be sent to the second endpoint device 30 in a third packet P3, which may be the first original IP packet OP1 or a new packet comprising the first communication protocol packet CPP1, where in case the third packet P3 being a new packet it may have the third address AD3 of the second endpoint device 30 as destination address and the sixth address AD6 of the second interface device 26 acting as receiving redundancy handling device as a source address. Moreover, also the third packet P3 is an Internet Protocol packet in the Internet Layer of the TCP/IP model or a network protocol packet in the Network Layer of the OSI model.

This second embodiment has the advantage of providing communication redundancy between the system areas even if the first and second endpoint devices have limited capability with regard to redundancy such as the inability to discard redundant packets. The redundancy handling functions can also be placed in already existing devices, such as a connectivity servers, gateways and routers.

It should here be realized that there may be two communication networks also in the second embodiment. The second interface device may also have two different IPv6 addresses and the first interface device may send the first IPv6 packet to the second interface device via one of the communication networks using one of these IPv6 addresses and the second IPv6 packet to the second interface device via the other communication network using the other IPv6 address.

One reason for having one communication network as outlined in FIG. 7 is that the providing of two completely different redundant communication networks can be expensive. For this reason, redundancy can be implemented through the same communication network being shared to send the duplicate frames along two different paths.

Figure 14:
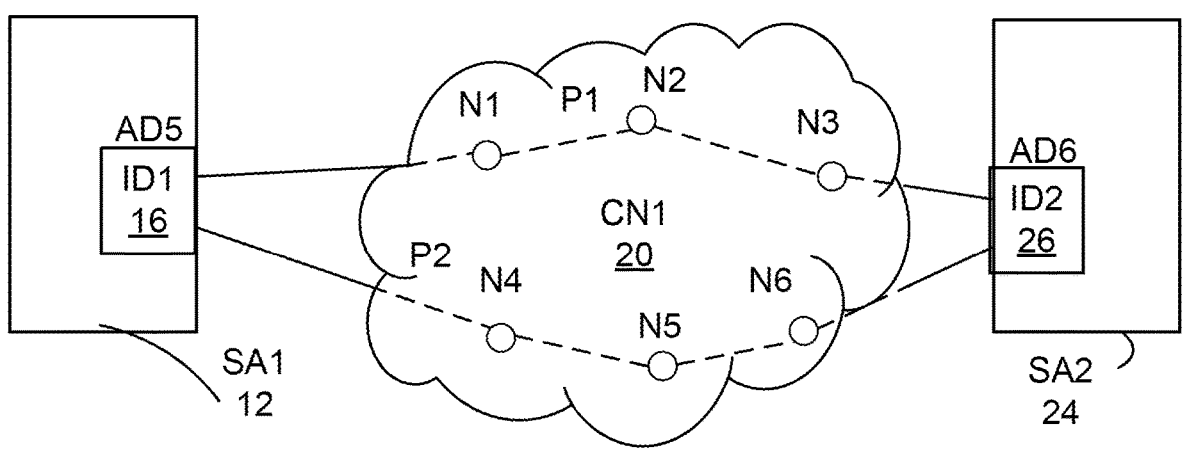
FIG. 14 shows a variation of the automation system where the first and the second data packets are sent along two communication paths that pass through different nodes of the first communication network, and FIG. 15 schematically shows the first and the second IPv6 packets that are sent along the different paths in FIG. 14.

There is a possibility that if the two communication paths pass through the same communication network, then they may actually pass through the same node, such as through the same router. In this case, it would be possible to encounter a single point of failure. One aspect concerned with addressing this issue will now be described with reference being made to FIGS. 14 and 15, where FIG. 14 shows a variation of the automation system 10 in which the two communication paths pass through different nodes of the first communication network 20 and FIG. 15 shows the first and the second IPv6 packets P1, P2 that are sent along the different paths in FIG. 14.

Figure 15:
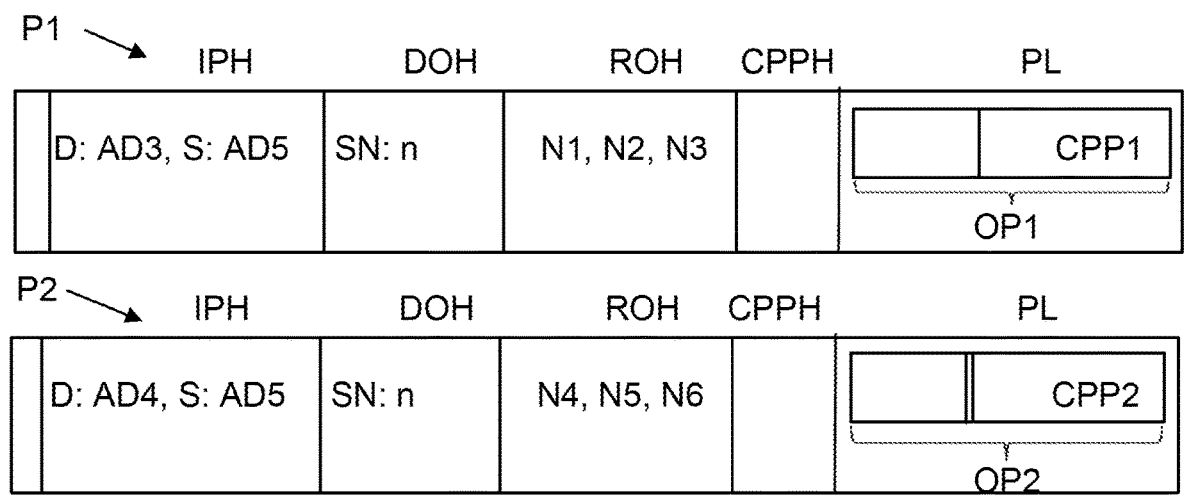

As can be seen in FIG. 15, the first and second IPv6 packet P1, P2 comprise a further extension header in the form of an IPv6 routing header ROH. Such a header is included in a packet when the immediately preceding field comprises a predefined character combination, which as an example is the character combination of 43. According to this variation the transmission redundancy handling function generates the packets P1, P2 with an IPv6 routing header ROH and inserts, in the IPv6 routing header ROH, identifiers of nodes that that the packet is to pass when travelling from the transmission redundancy handling device that implements the transmission redundancy handling function to the receiving redundancy handling device that implements the receiving redundancy handing function, which devices are the first and the second endpoint devices in the first embodiment and the first and the second interface devices in the second embodiment. The transmission redundancy handling function thus indicates intermediate nodes of the automation system that the IPv6 packets are to pass when traveling along the corresponding communication path. The transmission redundancy handling function more particularly ensures that all intermediate nodes of the first and the second paths specified in the first and the second IPv6 packet P1, P2 differ from each other. The ensuring thus comprises setting different nodes in the IPv6 routing header ROH of the first and second IPv6 packets P1, P2. None of the specified nodes is thereby present in both of the paths.

As an example the first IPv6 packet P1 is to pass a first, second and third node N1, N2 and N3 between its source and destination, while the second IPv6 packet P2 is to pass a fourth, fifth and sixth node N4, N5 and N6 between the source and destination.

It can thereby be seen that the routing header of the duplicate packets contains different intermediate router addresses so that the packets traverse two different paths without any joint intermediate nodes. In this case it is assumed that the end devices are configured with the intermediate addresses.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method of handling redundancy for packets transmitted from a first system area of an automation system to a second system area of the automation system, the method being performed by a transmitting redundancy handling function of a transmitting redundancy handling device in the first system area and comprising:
    obtaining a first communication protocol packet having automation application data for which redundancy is to be provided and a sequence number linked to the automation application data;
    extracting the sequence number from the first communication protocol packet;
    placing the sequence number in a destination option header of a first IPv6 packet intended for a receiving redundancy handling device in the second system area, said first IPv6 packet also comprising the first communication protocol packet;
    sending the first IPv6 packet to the receiving redundancy handling device;
    obtaining a second communication protocol packet having the same automation application data and the same sequence number;
    placing the sequence number in a destination option header of a second IPv6 packet intended for the receiving redundancy handling device, said second IPv6 packet also including the second communication protocol packet; and
    sending the second IPv6 packet to the receiving redundancy handling device.

2. The method according to claim 1, wherein the first and the second IPv6 messages each comprise an IPv6 routing header indicating intermediate nodes of the automation system that the IPv6 packets are to pass when travelling from the transmitting to the receiving redundancy handling device and further including ensuring that all intermediate nodes specified in the first and the second IPv6 packet differ from each other.

3. The method according to claim 2, wherein the obtaining of the first communication protocol packet comprises generating the first communication protocol packet and the obtaining of the second communication protocol packet includes copying at least the automation application data of the first communication protocol packet.

4. The method according to claim 2, wherein the first and the second communication protocol packets are received from a first endpoint device and are intended for a second endpoint device connected to the receiving redundancy handling device, and further comprising placing the first communication protocol packet in a payload of the first IPv6 packet, extracting the sequence number from the second communication protocol packet and placing the second communication protocol packet in a payload of the second IPv6 packet.

5. The method according to claim 1, wherein the obtaining of the first communication protocol packet comprises generating the first communication protocol packet and the obtaining of the second communication protocol packet includes copying at least the automation application data of the first communication protocol packet.

6. The method according to claim 1, wherein the first and the second communication protocol packets are received from a first endpoint device and are intended for a second endpoint device connected to the receiving redundancy handling device, and further comprising placing the first communication protocol packet in a payload of the first IPv6 packet, extracting the sequence number from the second communication protocol packet and placing the second communication protocol packet in a payload of the second IPv6 packet.

7. A method of handling redundancy for packets received in a second system area of an automation system from a first system area of the automation system, the method being performed by a receiving redundancy handling function of a receiving redundancy handling device and comprising:
    receiving a first IPv6 packet from a transmitting redundancy handling device of the first system area, said first IPv6 packet including automation application data and a destination option header including a sequence number associated with the automation application data;
    analysing the destination option header of the first IPv6 packet with regard to sequence number;
    receiving a second IPv6 packet from the transmitting redundancy handling device including the same automation application data and a destination option header with the same sequence number;
    analysing the destination option header of the second IPv6 packet with regard to sequence number;
    determining that the sequence number is the same in the first and the second IPv6 packet; and
    discarding the first IPv6 packet or the second IPv6 packet based on the determination.

8. A transmitting redundancy handling device for a first system area of an automation system and for communicating with a receiving redundancy handling device in a second system area of the automation system, the transmitting redundancy handling device comprising processor configured to implementing a transmission redundancy handling function configured to:
    obtain a first communication protocol packet having automation application data for which redundancy is to be provided and a sequence number linked to the automation application data;
    extract the sequence number from the first communication protocol packet;
    place the sequence number in a destination option header of a first IPv6 packet intended for the receiving redundancy handling device, said first IPv6 packet also comprising the first communication protocol packet;
    send the first IPv6 packet to the receiving redundancy handling device;
    obtain a second communication protocol packet having the same automation application data and the same sequence number;
    place the sequence number in a destination option header of a second IPv6 packet intended for the receiving redundancy handling device, said second IPv6 packet also comprising the second communication protocol packet; and
    send the second IPv6 packet to the receiving redundancy handling device.

9. The transmitting redundancy handling device according to claim 8, wherein the first and the second IPv6 packets each comprise an IPv6 routing header indicating intermediate nodes of the automation system that the IPv6 packets are to pass when travelling from the transmitting to the receiving redundancy handling device and the transmitting redundancy handling function is further configured to ensure that all intermediate nodes specified in the first and the second IPv6 packet differ from each other.

10. The transmitting redundancy handling device according to claim 9, wherein the first communication protocol packet is obtained through being generated by the transmitting redundancy handling function and the second communication protocol packet is obtained based on copying at least the automation application data of the first communication protocol packet.

11. The transmitting redundancy handling device according to claim 9, wherein the first and the second communication protocol packets are received from a first endpoint device, are intended for a second endpoint device connected to the receiving redundancy handling device and placed in the payloads of the first and the second IPv6 packets.

12. The transmitting redundancy handling device according to claim 8, wherein the first communication protocol packet is obtained through being generated by the transmitting redundancy handling function and the second communication protocol packet is obtained based on copying at least the automation application data of the first communication protocol packet.

13. The transmitting redundancy handling device according to claim 8, wherein the first and the second communication protocol packets are received from a first endpoint device, are intended for a second endpoint device connected to the receiving redundancy handling device and placed in the payloads of the first and the second IPv6 packets.

14. A receiving redundancy handling device for a second system area of an automation system and for communicating with a transmitting redundancy handling device of a first system area of the automation system, the receiving redundancy handling device comprising a processor configured to implementing a receiving redundancy handling function configured to:
    receive a first IPv6 packet from the transmitting redundancy handling device, said first IPv6 packet comprising automation application data and a destination option header including a sequence number associated with the automation application data;
    analyse the destination option header of the first IPv6 packet with regard to sequence number;
    receive a second IPv6 packet from the transmitting redundancy handling device comprising the same automation application data and a destination option header with the same sequence number;
    analyse the destination option header of the second IPv6 packet with regard to sequence number;
    determine that the sequence number is the same in the first and the second IPv6 packet; and
    discard the first IPv6 packet or the second IPv6 packet based on the determination.

15. A computer program product for handling redundancy for packets transmitted from a first system area of an automation system to a second system area of the automation system, the computer program product comprising a non-transitory data carrier with the computer program code which when run by a processor implements a transmitting redundancy handling function of a transmitting redundancy handling device in the first system area configured to:
    obtain a first communication protocol packet having automation application data for which redundancy is to be provided and a sequence number linked to the automation application data;
    extract the sequence number from the first communication protocol packet;
    place the sequence number in a destination option header of a first IPv6 packet intended for a receiving redundancy handling device in the second system area, said first IPv6 packet also including the first communication protocol packet;
    send the first IPv6 packet to a receiving redundancy handling device; obtain a second communication protocol packet having the same automation application data;
    place the sequence number in a destination option header of a second IPv6 packet intended for the receiving redundancy handling device, said second IPv6 packet also including the second communication protocol packet; and send the second IPv6 packet to the receiving redundancy handling device.

16. A computer program product for handling redundancy in packets received in a second system area of an automation system from a first system area of the automation system, the computer program product comprising a non-transitory data carrier with program code which when run by a processor implements a receiving redundancy handling function of a receiving redundancy handling device in the second system area and configured to:

receive a first IPv6 packet from a transmitting redundancy handling device of the first system area, said first IPv6 packet including automation application data and a destination option header including a sequence number associated with the automation application data;

analyse the destination option header of the first IPv6 packet with regard to sequence number;

receive a second IPv6 packet from the transmitting redundancy handling device including the same automation application data and a destination option header with the same sequence number;

analyse the destination option header of the second IPv6 packet with regard to sequence number;

determine that the sequence number is the same in the first and the second IPv6 packet; and discard the first IPv6 packet or the second IPv6 packet based on the determination.

17. An automation system comprising:

a first system area including a transmitting redundancy handling device and a second system area including a receiving redundancy handling device, the transmitting redundancy handling device comprising a first processor configured to implementing a transmission redundancy handling function configured to:

obtain a first communication protocol packet having automation application data for which redundancy is to be provided and a sequence number linked to the automation application data;

extract the sequence number from the first communication protocol packet;

place the sequence number in a destination option header of a first IPv6 packet intended for the receiving redundancy handling device, said first IPv6 packet also including the first communication protocol packet;

send the first IPv6 packet to the receiving redundancy handling device;

obtain a second communication protocol packet having the same automation application data and the same sequence number;

place the sequence number in a destination option header of a second IPv6 packet intended for the receiving redundancy handling device, said second IPv6 packet also including the second communication protocol packet; and send the second IPv6 packet to the receiving redundancy handling device;

the receiving redundancy handling device comprising a second processor configured to implementing a receiving redundancy handling function configured to:

receive the first IPv6 packet from the transmitting redundancy handling device;

analyse the destination option header of the first IPv6 packet with regard to sequence number;

receive the second IPv6 packet from the transmitting redundancy handling device;

analyse the destination option header of the second IPv6 packet with regard to sequence number;

determine that the sequence number is the same in the first and the second IPv6 packet; and discard the first IPv6 packet or the second IPv6 packet based on the determination.

* * * * *